(12) United States Patent
Willoughby (10) Patent No.: US 9,673,976 B2
(45) Date of Patent: *Jun. 6, 2017

(54) METHOD AND SYSTEM FOR ENCRYPTION OF BLOCKS OF DATA

(71) Applicant: International Business Machines Corporation, Armonk, NY (US)

(72) Inventor: Philip G. Willoughby, Milton Keynes (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/811,809

(22) Filed: Jul. 28, 2015

(65) Prior Publication Data

US 2015/0333907 A1    Nov. 19, 2015

Related U.S. Application Data

(63) Continuation of application No. 12/139,081, filed on Jun. 13, 2008, now Pat. No. 9,124,418.

(30) Foreign Application Priority Data

Jun. 15, 2007 (GB) .................................. 0711711.2

(51) Int. Cl.
*H04L 9/08* (2006.01)
*H04L 29/06* (2006.01)
*H04L 9/06* (2006.01)

(52) U.S. Cl.
CPC .......... *H04L 9/0869* (2013.01); *H04L 9/0637* (2013.01); *H04L 63/0435* (2013.01); *H04L 63/061* (2013.01); *H04L 2209/125* (2013.01); *H04L 2209/38* (2013.01)

(58) Field of Classification Search
CPC ...................................................... H04L 9/0869
USPC ....................................................... 713/171
See application file for complete search history.

(56) References Cited

U.S. PATENT DOCUMENTS

6,963,976 B1    11/2005    Jutla
2006/0285684 A1    12/2006    Rogaway

*Primary Examiner* — Dant Shaifer Harriman
(74) *Attorney, Agent, or Firm* — Steven M. Greenberg, Esq.; CRGO Law (57) ABSTRACT

A method for encryption of blocks of data is provided including the steps of: encrypting a block of data using a current random number generated for the block of data; encoding the current random number using one or more of a set of previous random numbers, each of the set of previous random numbers having been used to encrypt a previously sent block of data; and transmitting the encrypted block of data with the one or more versions of the encoded current random number, each version for a different one of the previous random numbers. A method for decryption of blocks of data is provided including the steps of: receiving an encrypted block of data with the one or more versions of an encoded current random number, each version for a different one of the previous random numbers; selecting one of a set of previously received blocks of data for which the random number is available; decoding the current random number using the random number of the selected previously received block of data; and decrypting the received encrypted block of data using the decoded current random number.

11 Claims, 7 Drawing Sheets

FIG. 4

METHOD AND SYSTEM FOR ENCRYPTION OF BLOCKS OF DATA

CROSS-REFERENCE TO RELATED APPLICATION

This application is a Continuation of U.S. application Ser. No. 12/139,081, filed Jun. 13, 2008, now allowed, which claims priority under 35 U.S.C. §119(a) to European Patent Application Number GB0711711.2, filed Jun. 15, 2007, the entirety of which are incorporated herein by reference.

This invention relates to the field of encryption of blocks of data. In particular, it relates to a block cipher for use in environments in which receipt of all the preceding blocks is not guaranteed.

In cryptography, a block cipher operates on blocks of fixed length, often 64 or 128 bits. Because messages may be of any length, and because encrypting the same plaintext under the same key always produces the same output, several modes of operation have been developed which allow block ciphers to provide confidentiality for messages of arbitrary length.

In the cipher-block chaining (CBC) mode, each block of plaintext is XORed (exclusive-or operation applied) with the previous ciphertext block before being encrypted. Each ciphertext block is dependent on all plaintext blocks processed up to that point. To make each message unique, an initialization vector (IV) must be used in the first block.

The IV is a dummy block to start the process for the first real block. In CBC the IV is randomly generated at encryption time. There is no need for the IV to be secret, in most cases, but it is important that it is not reused with the same key.

Figure 1A:
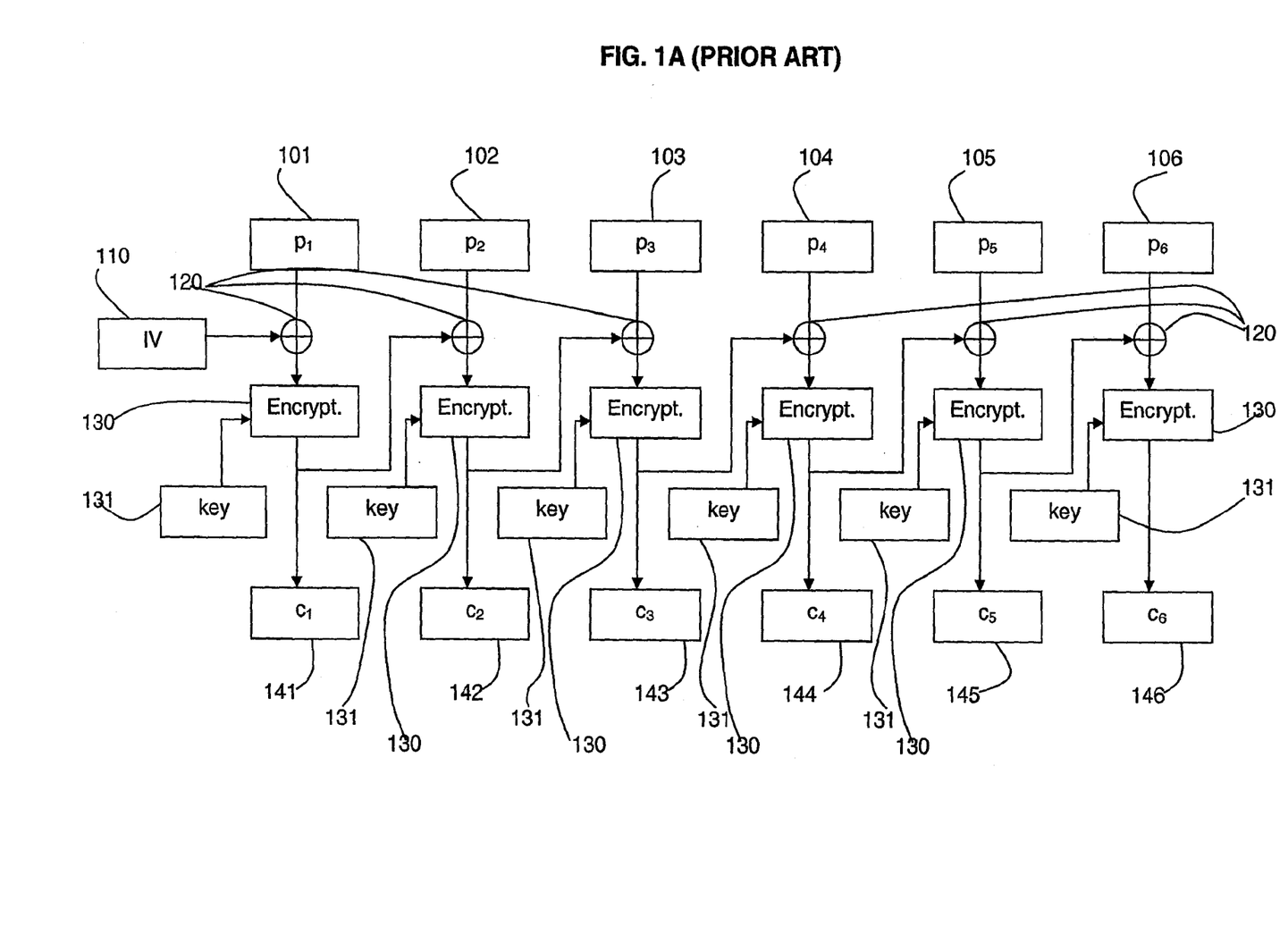
FIGS. 1A and 1B are diagrams of CBC mode of encryption and decryption as known in the prior art.
Figure 1B:
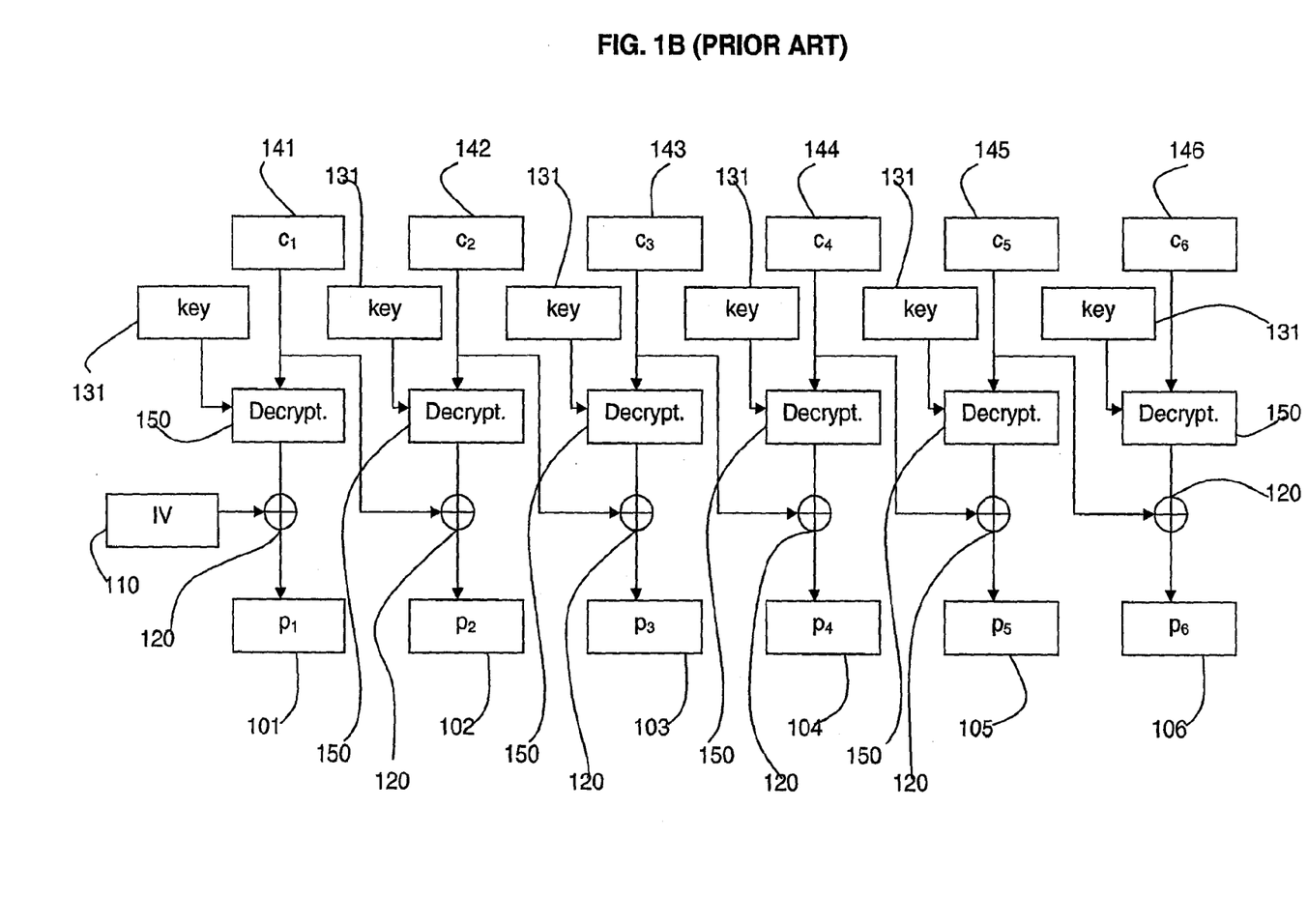

FIGS. 1A and 1B show the process of encryption and decryption using CBC. In FIG. 1A, the blocks of plaintext to be encrypted are provided $p_1, p_2, \ldots$ 101-106. An IV 110 is generated and XORed 120 with the first block of plaintext $p_1$ 101. The result is encrypted using the block cipher encryption 130 with a key 131. The result is the first block of ciphertext $c_1$ 141 which is transmitted to the recipient. The first block of ciphertext $c_1$ 141 is XORed 120 with the second block of plaintext $p_2$ 102 and the result is encrypted using the block cipher encryption 130 with the key 131. The result is the second block of ciphertext $c_2$ 142 which is transmitted to the recipient. This chain continues to produce the subsequent ciphertext blocks $c_3, c_4, c_5, c_6$ 143-146 from the remaining plaintext blocks $p_3, p_4, p_5, p_6$ 103-106.

FIG. 1B shows the decryption process. The blocks of ciphertext are received $c_1, c_2, \ldots, c_6$ 141-146. The first block of ciphertext $c_1$ 141 is decrypted using the block cipher decryption 150 with the key 131 which as been supplied to the recipient. The result is XORed 120 with the IV 110 which has been supplied to the recipient and this results in the first block of plaintext $p_1$ 101. The second block of ciphertext $c_2$ is then decrypted using the block cipher decryption 150 with the key 131. The result is XORed 120 with the first block of ciphertext $c_1$ and this results in the second block of plaintext $p_2$ 101. This chain continues to produce the subsequent plaintext blocks $p_3, p_4, p_5, p_6$ 103-106 from the remaining ciphertext blocks $c_3, c_4, c_5, c_6$ 143-146.

Cipher-block chaining has the limitation that it requires the previous block of ciphertext to have been received in order to decrypt the next block. In some environments delivery is not guaranteed and this can lead to a break in the chain.

Multicast protocols are perforce unreliable. There is no way to guarantee that all recipients will receive everything they should have received. This causes problems with security as it is not possible to use a block cipher in CBC mode as this requires that the recipient have access to the immediately preceding ciphertext element; which cannot be guaranteed in the case of multicast.

Current encryption of multicast streams using block ciphers is limited to electronic codebook (ECB) mode and counter (CTR) mode.

ECB mode is not a very good way to hide data. The message is divided into blocks and each block is encrypted separately. The disadvantage of this method is that identical plaintext blocks are encrypted into identical ciphertext blocks; thus, it does not hide data patterns well.

CTR mode is a good way to hide data. Each block of the message is XORed with a pseudorandom number before transmission. The pseudorandom numbers are generated in a sequence which can be predicted by the recipient of the message blocks because they are obtained by encrypting a well-known counter value with a secret key in ECB mode. The risk inherent in CTR mode is that the algorithm used to generate the pseudorandom numbers from the well-known counter may be vulnerable to a "known plaintext" attack, or may even be reversible given enough data. If this is the case, CTR mode becomes useless.

If the network across which the multicast datastream is being sent has been secured against unauthorised intrusion, it may be unnecessary to attempt to encrypt the multicast datastream. This is extremely unlikely to be the case.

According to a first aspect of the present invention there is provided a method for encryption of blocks of data, comprising: encrypting a block of data using a current random number generated for the block of data; encoding the current random number using one or more of a set of previous random numbers, each of the set of previous random numbers having been used to encrypt a previously sent block of data; transmitting the encrypted block of data with one or more versions of the encoded current random number, each version having been encoded using a different one of the previous random numbers.

According to a second aspect of the present invention there is provided a method for decryption of blocks of data, comprising: receiving an encrypted block of data with one or more versions of an encoded current random number, each version having been encoded using a different one of previously used random numbers; selecting one of a set of previously received blocks of data for which the random number is available; decoding the current random number using the random number of the selected previously received block of data; and decrypting the received encrypted block of data using the decoded current random number.

According to a third aspect of the present invention there is provided a computer program product stored on a computer readable storage medium, comprising computer readable program code means for performing the steps of: encrypting a block of data using a current random number generated for the block of data; encoding the current random number using one or more of a set of previous random numbers, each of the set of previous random numbers having been used to encrypt a previously sent block of data; transmitting the encrypted block of data with one or more versions of the encoded current random number, each version having been encoded using a different one of the previous random numbers.

According to a fourth aspect of the present invention there is provided a computer program product stored on a computer readable storage medium, comprising computer readable program code means for performing the steps of: receiving an encrypted block of data with one or more versions of an encoded current random number, each version having been encoded using a different one of previously used random numbers; selecting one of a set of previously received blocks of data for which the random number is available; decoding the current random number using the random number of the selected previously received block of data; and decrypting the received encrypted block of data using the decoded current random number.

According to a fifth aspect of the present invention there is provided a system for transmitting blocks of data, comprising: means for encrypting a block of data using a current random number generated for the block of data; means for encoding the current random number using one or more of a set of previous random numbers, each of the set of previous random numbers having been used to encrypt a previously sent block of data; means for transmitting the encrypted block of data with one or more versions of the encoded current random number, each version having been encoded using a different one of the previous random numbers; means for receiving the encrypted block of data with the one or more versions of an encoded current random number; means for selecting one of a set of previously received blocks of data for which the random number is available; means for decoding the current random number using the random number of the selected previously received block of data; and means for decrypting the received encrypted block of data using the decoded current random number.

Embodiments of the present invention will now be described, by way of examples only, with reference to the accompanying drawings in which.

A method of block cipher encryption and decryption is provided which has resilience for a recipient to decipher a block whilst not having received the immediately preceding block. The resilience is provided by allowing a block to be deciphered from one of a set of previously received blocks.

In an embodiment of the described method a random value is generated to XOR with the input plaintext at each block. This random input value is encoded in a way which the recipients will be able to decode provided they have received one of a set of the preceding ciphertexts. This randomly selected value has the same function as the Initialization Vector (IV) in the first stage of CBC operating mode.

Figure 2A:
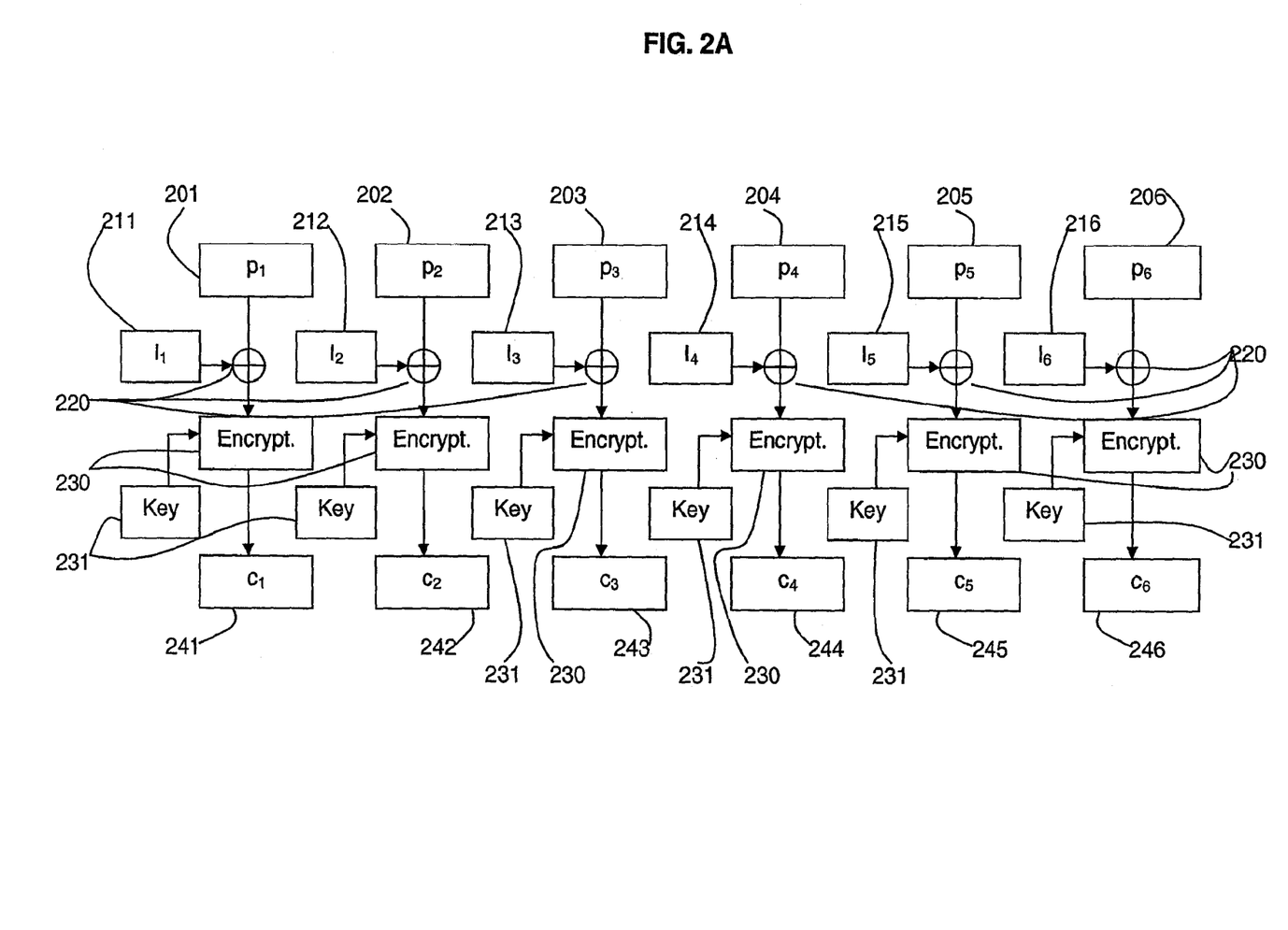
FIG. 2A is a schematic diagram of a method of encryption in accordance with the present invention.

Referring to FIG. 2A, an embodiment of the described method of encryption is shown. The blocks of plaintext to be encrypted are provided $p_1, p_2, \ldots$ 201-206. A random number is generated and used as an input vector $I_1$ 211 which is XORed 220 with the first block of plaintext $p_1$ 201. The result is encrypted using a block cipher encryption 230 with a key 231. The result is the first block of ciphertext $c_1$ 241 which is transmitted to the recipient. Many pseudo-random number generators are known in the art to provide sufficiently random numbers for cryptographic applications, and the term "random number" as used herein is intended to encompass such pseudo-random numbers.

A new random number is generated as an input vector $I_2$ 212 which is XORed 220 with the second block of plaintext $p_2$ 202. The result is encrypted using the block cipher encryption 230 with the key 231. The result is the second block of ciphertext $c_2$ 242 which is transmitted to the recipient.

This process continues generating random numbers to be used as input vectors $I_3, I_4, I_5, I_6$ 213-216 to produce the subsequent ciphertext blocks $c_3, c_4, c_5, c_6$ 243-246 from the remaining plaintext blocks $p_3, p_4, p_5, p_6$ 203-206.

The input vectors $I_1, I_2, I_3, I_4, I_5, I_6$ 211-216 are similar in function to the initialization vector 110 of the CBC mode of operation; however, a random input vector is generated for each block of plaintext to be encrypted.

Figure 2B:
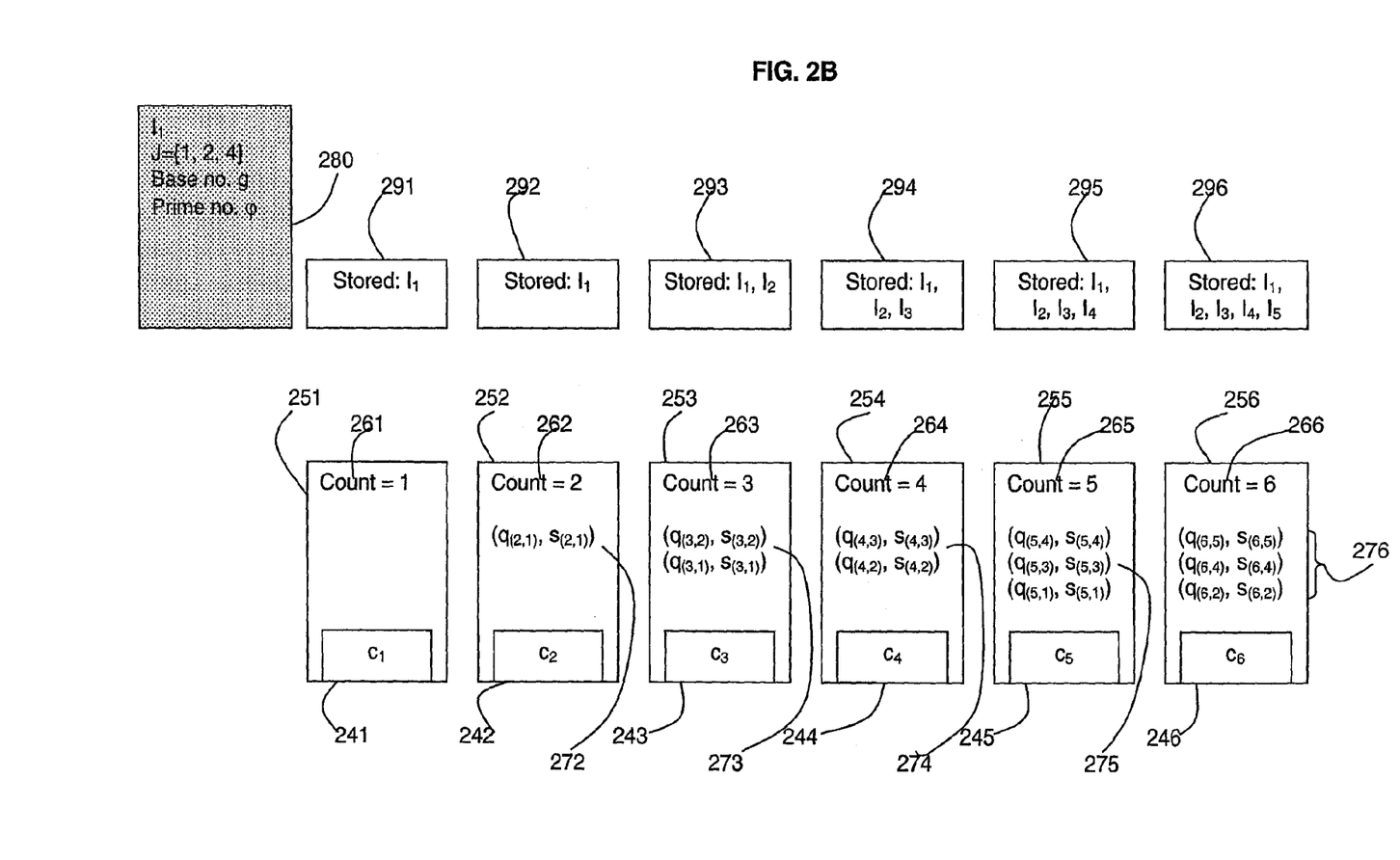
FIG. 2B is a schematic diagram of the transmitted data in accordance with the present invention.

Referring to FIG. 2B, a schematic diagram shows the data transmitted. In the described method, a secure and reliable connection is used to transmit the initial parameters 280 including the session key. The initial parameters 280 also include the first input vector $I_1$, the defined set of previous blocks used for the encoding of the input vectors, and the input values used in the functions for generating the encoded input vectors transmitted in the block headers.

As shown in FIG. 2B, a block of ciphertext $c_1, c_2, c_3, c_4, c_5, c_6$ 241-246 is transmitted with a header 251-256 which contains a count 261-266, and means 271-276 for generating a current input vector from one of a set of previous input vectors. In one embodiment, the means 271-276 is a pair of functions $(q_{(i,i-j)}, s_{(i,i-j)})$ for each of a set of previous blocks. The pair of functions $(q_{(i,i-j)}, s_{(i,i-j)})$ together with the previous input vector $I_{i-j}$ can be used to determine the current input vector $I_i$.

Previous input vectors are stored 291-296 as they are decoded by the recipient for use in decoding later input vectors.

The set of previous blocks is a set of a predefined numbers of blocks prior to a current block. For example, this may be the previous four blocks, the previous alternate three blocks, or, as in the given example, a set of blocks with i-j, where j is one of the set of J={1, 2, 4, 6} etc. Only one of the set of previous blocks must have been received in order to obtain the current input vector.

Subsequent blocks of ciphertext $c_i$, have a header including the count of i and a means for generating the current $i^{th}$ input vector $I_i$ from one of a set of previous input vectors $I_{i-j}$. The set may be a set $I_{i-j}$ where j is a set of integers such as J={1, 2, 4, 6} as shown in FIG. 2B. Adding more numbers to the set J increases the resilience as there are more options for using different previously received blocks, enabling more blocks to be lost. However, this must be balanced with the data required in the header for the set J which reduces the amount of payload data in each block.

If an immediately preceding block has not been received, a current block can be decrypted by determining the current input vector from the functions provided in the current block header for any one of a set of previous blocks and the previous block's input vector.

Figure 2C:
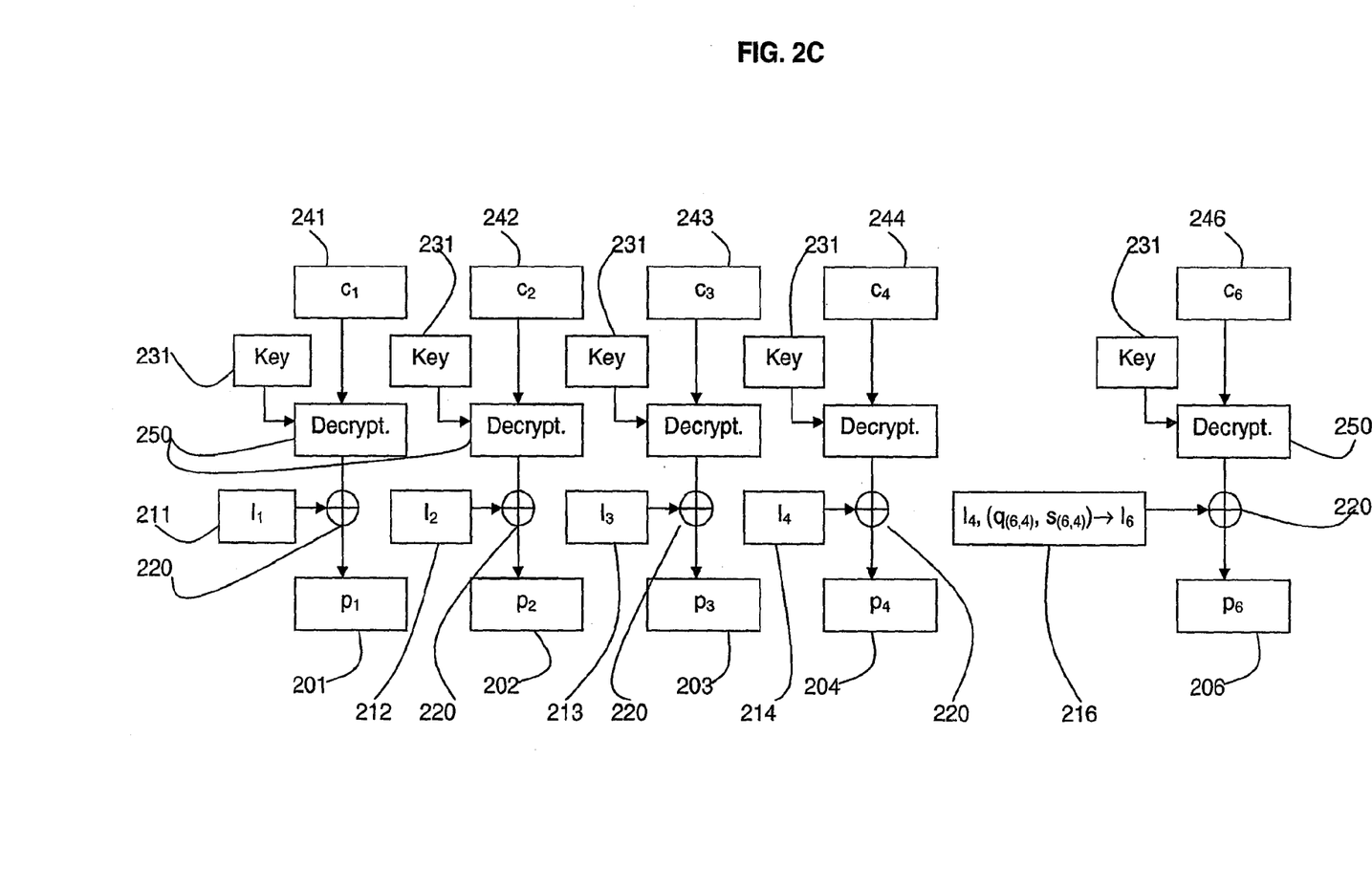
FIG. 2C is a schematic diagram of a method of decryption in accordance with the present invention.

Referring to FIG. 2C an embodiment of the described method of decryption is shown. The blocks of ciphertext are received $c_1, c_2, \ldots, c_6$ 241-246 each having corresponding headers 251-256 as shown in FIG. 2B.

A first block of ciphertext $c_1$ 241 is decrypted using the block cipher decryption 250 with the key 231 which as been supplied to the recipient. The result is XORed 220 with the first input vector $I_1$ 211 which has been supplied to the recipient and this results in the first block of plaintext $p_1$ 201.

A second block of ciphertext $c_2$ 242 is received with a header 252 with the count 262 of 2 and a means 272 for generating the current second input vector $I_2$ 212 from the first input vector $I_1$ 211.

A second block of ciphertext $c_2$ is decrypted using the block cipher decryption 250 with the key 231. The result is XORed 220 with the second input vector $I_2$ 212 and this results in the second block of plaintext $p_2$ 202.

Subsequent blocks of ciphertext $c_i$ 242 are received as shown in FIG. 2B, with a header with the count of i and a means for generating the current $i^{th}$ input vector $I_i$ from a predefined set of previous input vectors $I_{i-j}$. The predefined set is shown as a set $I_{i-j}$ where J is a set of integers such as J={1, 2, 4, 6}.

The subsequent block of ciphertext $c_i$ is decrypted using the block cipher decryption 250 with the key 231. The result is XORed 220 with the $i^{th}$ input vector $I_i$ 212 and this results in the $i^{th}$ block of plaintext $p_i$.

A sixth block of ciphertext $c_6$ 246 is received with a header 256 with the count 266 of 6 and a means 276 for generating the current sixth input vector $I_6$ 216 from one of the second, fourth or fifth input vectors $I_2$ 212, $I_4$ 214, and $I_5$ 215. As an example, the fifth block of ciphertext $c_5$ 245 may not have been received, therefore either the fourth or the second input vector $I_2$ 212, $I_4$ 214 may be used, which have been previously stored, to obtain the sixth input vector $I_6$ 216.

The sixth block of ciphertext $c_6$ is decrypted using the block cipher decryption 250 with the key 231. The result is XORed 220 with the sixth input vector $I_6$ 216 and this results in the sixth block of plaintext $p_6$ 206.

Figure 3:
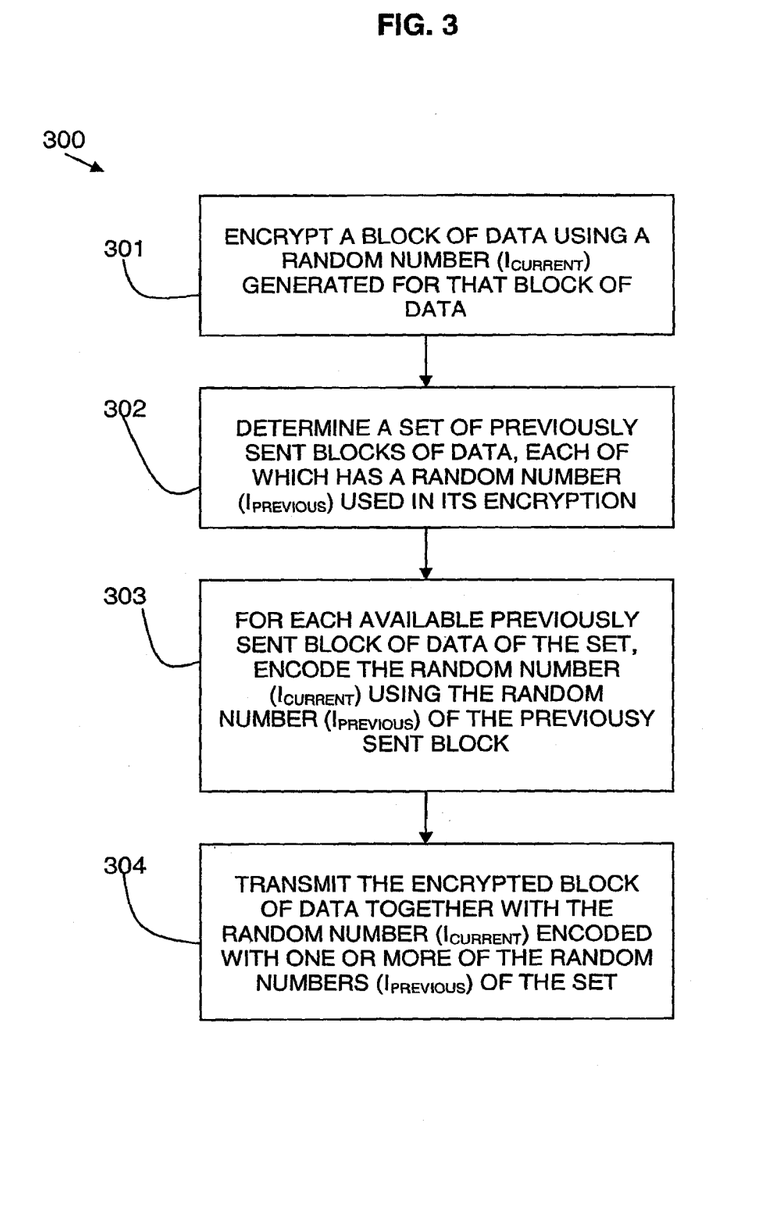
FIG. 3 is a flow diagram of a method of encryption in accordance with the present invention.

Referring to FIG. 3, a flow diagram 300 of the described method of encryption is shown.

A preliminary step of communicating the required keys on a secure, reliable connection between a transmitter and one or more receivers is carried out before a session. In such a communication, the following information is transmitted:
  an encryption session key;
  a set of defined previous blocks, for example, a set given by a series of numbers of earlier blocks;
  parameters needed for the decoding of an input vector;
  an initial random number used as the first input vector $I_1$.

At each step in a session, the flow diagram of FIG. 3 is carried out. A block of data is encrypted 301 using a random number ($I_{current}$) generated for that block of data. The random numbers are also referred to as input vectors.

In one embodiment, the encryption 301 is carried out by performing a bitwise exclusive-or operation with the block of data and the random number ($I_{current}$), and then encrypting the result with an encryption function using a session key. Other forms of encryption using the random number ($I_{current}$) may alternatively be used.

It is then determined 302 which previously sent blocks of data are in the defined set. Each of the previously sent blocks of data has a different random number ($I_{previous}$) which was used in that block's encryption.

For each available previously sent block of data in the set, the random number ($I_{current}$) of the currently processed block of data is encoded 303 using the random number ($I_{previous}$) of the previously sent block of data.

This encoding can be carried out in parallel for all available random numbers ($I_{previous}$) of the set. The step of encrypting 301 can also be carried out in parallel with the encoding 303. The parallel nature of this algorithm makes it ideally suited to implementation in hardware or as software for a stream-oriented co-processor such as the Cell microprocessor's Synergistic Processing Elements (SPEs).

When a first block of data in a session is being encrypted, there will be no previously sent blocks of data in the set available to use. This is why the first random number $I_1$ is sent over the secure connection.

When blocks of data are being encrypted early on in the session, only one or two previously sent blocks of data in the set may be available. As the session proceeds the number of previously sent blocks in the set being available increases giving more resilience to the method.

The encrypted block of data is transmitted 304 together with the random number ($I_{current}$) encoded with one or more of the random numbers ($I_{previous}$) of the set.

Figure 4:
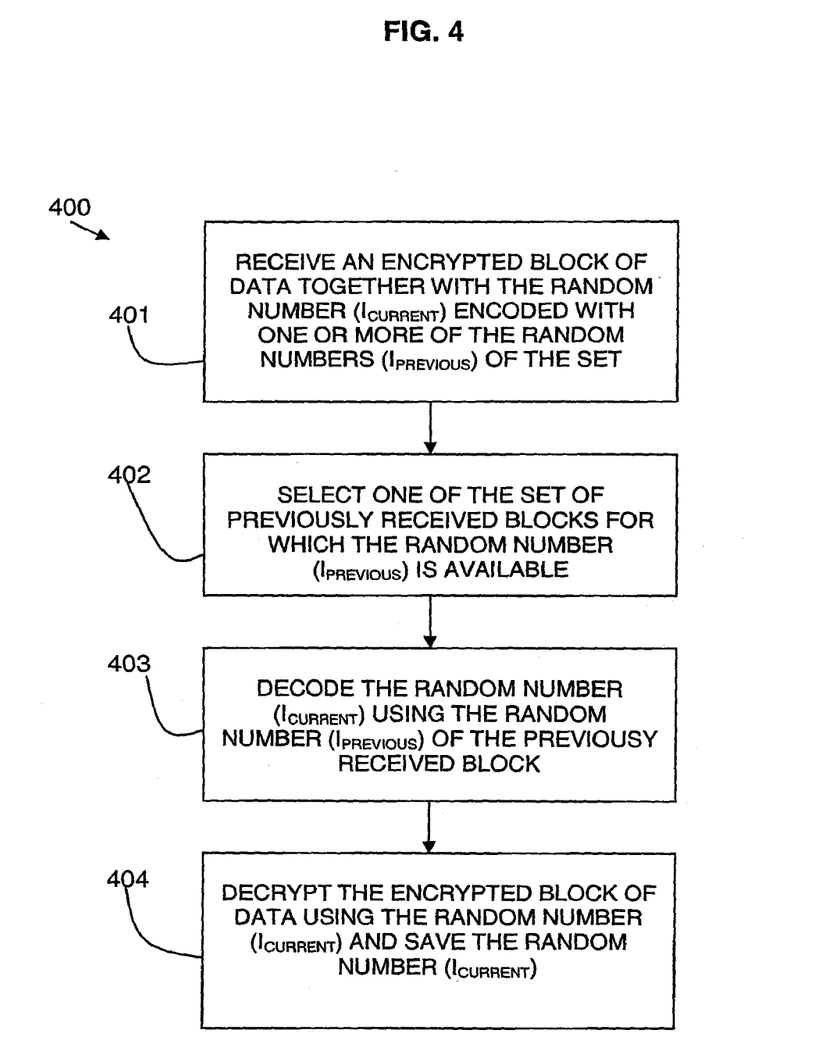
FIG. 4 is a flow diagram of a method of decryption in accordance with the present invention.

Referring to FIG. 4, a flow diagram 400 of the described method of decryption is shown.

A preliminary step of communicating the required keys on a secure connection between a transmitter and one or more receivers is carried out before a session as described in relation to FIG. 3.

An encrypted block of data is received 401 together with a random number ($I_{current}$) encoded with one or more of the random numbers ($I_{previous}$) of previously received blocks of data in the set.

One of the set of previously received blocks of data is selected 402 for which the random number ($I_{previous}$) has been saved.

The random number ($I_{current}$) is decoded 403 using the random number ($I_{previous}$) of the selected previous block of data.

The encrypted block of data is decrypted 404 using the random number ($I_{current}$) and the random number ($I_{current}$) is saved for use in decoding subsequent blocks of data.

The described method enables a block of data to be decrypted when any one of the set of previously sent blocks of data has been received and itself decrypted. This provides a method which can be used when delivery of every block of data is not guaranteed.

FIG. 4 shows the steady-state operation of the method. New connectees will need to be given at least one $I_j$ before they can participate in the decryption.

An example embodiment of an algorithm of the described methods of encryption and decryption is provided. The algorithm uses the following definitions:
  A xor B—Perform a bitwise exclusive-or operation with operands A and B.
  A raised to the power B modulo C—Compute A to the power of B; the final result is the remainder when this intermediate result is divided by C.
  Prime number—An integer>1 which is divisible without remainder by no integer>1 other than itself
  Increment A—Add one to A.
  Random number—A number which is not predictable based on previous numbers obtained from the same source.
  Initialisation vector—A vector of data used to obscure a first block when using a cipher-block chaining encryption scheme.

The sending application carries out the following steps:
Selects a number, referred to as g. For example, g=2.
Selects a prime number, referred to as φ.
Selects a list of numbers, J, for instance J={1, 2, 4, 8}.

The selections of g, φ, and J are informed to the recipients, for example via a secure connection also used to transmit the encryption key.

The integer message counter C is set to zero.

For each message to be sent, the following steps are performed, for C=i:
Retrieve a random number, $I_i$.
Use $I_i$ as the input vector when enciphering the user data.
Repeated the following steps for each element j of the list J:
Set $I_{i-j}$ to the value of I used when the sequence number was i-j.
Retrieve a random number, $r_{ij}$.
Compute: $q_{ij}=g^{r_{ij}} \mod \phi$. This value is stored for later.
Compute: $s_{ij}=I_i \text{ xor } q_{ij}^{I_{i-j}} \mod \phi$. This value is stored for later.
Put C, all the pairs of $q_{ij}$ and $s_{ij}$ in the right order, and the enciphered user data into the message.
Send the message.
The receiving application does the following:
Connect to the sender with a secure and reliable connection and retrieve the following information:
g, $\phi$, J, most recent value of C, j' recent values of I.
Begin receiving messages over the unreliable link.
For each message received, perform the following steps:
Get C, all the pairs of $q_{ij}$ and $s_{ij}$, and the enciphered user data from the message.
Find a pair of $q_{ij}$ and $s_{ij}$ for which $I_{i-j}$ from the message C-j is known.
Using this information, compute $I_i=s_{ij} \text{ xor}(q_{ij}^{I_{i-j}} \mod \phi)$.
Discard old values of $I_{i-j}$ which are from messages older than C-j.
Use $I_i$ as the input vector to decode the user data
Give the decrypted user data to whoever wanted it.
Determining $I_i$ without knowledge of an $I_{i-j}$ for which $\{q_{ij}, s_{ij}\}$ are known requires computing a discrete logarithm, for which there is no known efficient algorithm.

Thus far, only the case where the block of data to be encrypted is exactly the size required by the encryption algorithm has been considered. In reality it is likely to be rather larger. In this situation, the method described above is used to encode the first encryption-algorithm-sized block of the message, and the known-art of CBC is used to encrypt the remainder of the message.

The described method has similarities to the CBC mode; however, it has the advantage that it can be used without the recipient having received the immediately preceding ciphertext. A random value is generated to XOR with the input plaintext for each block of data. This random input value referred to as the input vector is then encoded in a way which the recipients will be able to decode provided they have received one of a set of the preceding ciphertexts. This randomly selected value has the same function as the Initialization Vector (IV) in the first stage of CBC operating mode. The input vector could be sent in the clear, but this would make cryptanalysis easier.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

The method described in detail above serves the purpose of restricting access to data, and yet enables decryption by intended recipients of the data when it is not possible to ensure that all parts of the data stream will be received. Examples of such systems include broadcast and multicast network transmissions on the Internet, television broadcasts, broadcasts from communication satellites, radio broadcasts, but also physical media sent through the mail. The method is particularly well suited for situations in which it would be impractical or unhelpful to retransmit the missing parts of the data stream to those recipients who have not received the whole data stream. One example where retransmission would be worthless is broadcast television, since there is no value in showing a previously-missed part of a programme out of sequence. Another example is a publish/subscribe message broker that sends messages to subscribers using multicast over unreliable network links.

Improvements and modifications can be made to the foregoing without departing from the scope of the present invention.

The invention claimed is:

1. A computer program product stored on a non-transitory computer readable storage medium, comprising computer readable program code when executed by a transmitter computing device causes the transmitter computing device to perform the steps of:
    encrypting a block of data using a current random number generated for the block of data;
    encoding the current random number using each of one or more previous random numbers, each of the previous random numbers having been used to encrypt a previously sent block of data;
    transmitting the encrypted block of data together with one or more versions of the encoded current random number from the transmitter computing device to one or more receiver computing devices, each version having been encoded using a different one of the previous random numbers.

2. The computer program product of claim 1, wherein the one or more previous random numbers used for the predefined set of previously sent blocks of data is a set of given blocks in a pattern prior to the current block.

3. The computer program product of claim 1, wherein encrypting the block of data using the current random number includes performing a bitwise exclusive-or operation with the block of data and the current random number, and encrypting the result with an encryption function using a session key.

4. The computer program product of claim 1, further comprising determining:
    a session key,
    a set of defined previous blocks;
    parameters needed for decoding a random number; and
    an initial random number used for a first block of data.

5. The computer program product of claim 4, further comprising transmitting the session key, the set of defined previous blocks, the parameters needed for decoding the random number, and the initial random number used for the first block of data to the transmitter computing device.

6. The computer program product of claim 1, wherein encoding the current random number with each of one or more previous random numbers is carried out in parallel for all available previous random numbers.

7. The computer program product of claim 1, wherein encrypting the block of data is carried out in parallel with encoding the current random number with each of one or more previous random numbers.

8. A computer program product stored on a non-transitory computer readable storage medium, comprising computer readable program code when executed by a receiver computing device causing the receiver computing device to perform performing the steps of:
   receiving an encrypted block of data with one or more versions of an encoded current random number, each version having been encoded using a different one of previously used random numbers;
   selecting one of a set of previously received blocks of data for which one of the different ones of previously used random numbers is available;
   decoding the encoded current random number using the one of the different ones of previously used random numbers corresponding to the selected one of the set of previously received block of data; and
   decrypting the received encrypted block of data using the decoded current random number.

9. The computer program product of claim 8, wherein the decoded current random number is stored for use in decoding subsequent random numbers.

10. The computer program product of claim 8, wherein decrypting the received encrypted block of data further comprises decrypting the encrypted block of data using a session key and performing a bitwise exclusive-or operation with the result of the decryption using the session key and the decoded current random number.

11. The computer program product of claim 8, further comprising receiving a secure communication from a transmitter computing device including:
   a session key;
   a set of defined previous blocks;
   parameters needed for decoding a random number; and,
   an initial random number used for a first block of data.

* * * * *